United States Patent [19]
Bracha et al.

[11] 3,835,128
[45] Sept. 10, 1974

[54] CINNAMANILIDES

[75] Inventors: Peretz Bracha, Omer; Arie Waitman, Tel Aviv, both of Israel

[73] Assignee: Makhteshim Chemical Works Ltd., Beer-Sheva, Israel

[22] Filed: June 8, 1972

[21] Appl. No.: 260,900

[30] Foreign Application Priority Data
June 15, 1971 Great Britain.................... 28033/71

[52] U.S. Cl................... 260/240 J, 71/88, 71/118, 424/278, 424/324, 260/558 P, 260/559 R
[51] Int. Cl.......................................... C07c 103/22
[58] Field of Search........... 260/240 J, 558 R, 559 P

[56] References Cited
OTHER PUBLICATIONS

Johnston I, Tetrahedron, vol. 24, pp. 5595 to 5600 (1968).
Johnston II, J. Heterocyclic Chem., vol. 6, pp. 847 to 850 (1969).
Schultz et al., J. Am. Pharm. Assoc. Sci. Ed., vol. 48, pp. 750 to 752 (1959).
Good, Chemical Abstracts, vol. 56, cols. 7714 to 7715 (1962).

*Primary Examiner*—John D. Randolph
*Attorney, Agent, or Firm*—Banjamin J. Barish

[57] ABSTRACT

Cinnamanilides of the general formula

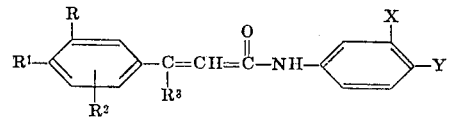

wherein R and $R^1$, which may be identical or different, each designates a member of the group consisting of chlorine, bromine, nitro, cyano, alkyl of one to four carbon atoms, alkoxy of one to four carbon atoms and wherein R and $R^1$ can form together a group -O-$CH_2$-O- or -O-$CH_2$-$CH_2$-O-, $R^2$ designates a member of the group consisting of hydrogen, chlorine, bromine, alkyl of one to four carbon atoms and alkoxy of one to four carbon atoms, $R^3$ designates a member of the group consisting of hydrogen, chlorine and bromine, and X and Y each designate chlorine or bromine, and a process for preparing same.

5 Claims, No Drawings

CINNAMANILIDES

BACKGROUND OF THE INVENTION

Various derivatives of cinnamic acid are known, some of being described as active therapeutical agents, and some as being effective pesticides. Some of the references describing derivatives of cinnamic acid are: Chemical Abstracts 42, 2515i, Chemical Abstracts 42, 2516a; Chemical Abstracts 48, 2583 e; Chemical Abstracts 52, 13675e; Chemical Abstracts 54, 7636f; Chemical Abstracts 54, 224671; 64, Abstracts 56, 7715a and Chemical Abstracts 64 6574b.

SUMMARY OF THE PRESENT INVENTION

The present invention relates to novel cinnamanilides of the formula

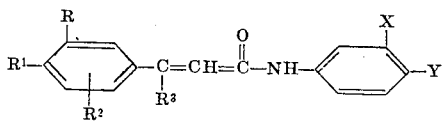

wherein R and $R^1$, which may be identical or different, each designates a member of the group consisting of chlorine, bromine, nitro, cyano, alkyl of one to four carbon atoms, alkoxy of one to four carbon atoms and wherein R and $R^1$ can form together a group -O-$CH_2$-O- or -O-$CH_2$-$CH_2$-O-, $R^2$ designates a member of the group consisting of hydrogen, chlorine, bromine, alkyl of one to four carbon atoms and alkoxy of one to four carbon atoms, $R^3$ designates a member of the group consisting of hydrogen, chlorine and bromine, and X and Y each designate chlorine or bromine, and to a process for the preparing these.

The novel cinnamanilides defined above are of value as biologically active materials, as fungicides, bacteriostats and herbicides. They can be used in pre- and in post-emergence herbicidal compositions, and are substantially non-toxic to useful crops, such as rice, soybeans and the like.

The method of preparing the novel compounds according to the present invention comprises reacting a suitably substituted derivative of cinnamic acid with thionyl chloride, phosphorus trichloride or other agent resulting in the desired substituted cinnamacyl halide and reacting the acyl halide with a 3,4-dihalo aniline in a suitable reaction medium.

The novel cinnamanilides can be used in the form of solutions, dispersions, dusts and the like, together with suitable adjuvants and carriers, as commonly used in the art.

DESCRIPTION OF THE PREFERRED EMBODIMENT

In the following there is described by way of illustration only the preparation of some of the novel cinnamanilides according to the present invention and there are presented certain data on further novel cinnamanilides prepared according to these examples. It is clear that these are to be construed in a non-limitative manner.

EXAMPLE 1 - Cinnamanilide

To 37.0 gr. (0.25 moles) of cinnamic acid were added 370 gr. of thionyl chloride, and the mixture refluxed for 4 hours. The excess of thionyl chloride was distilled at reduced pressure and the residue was shaken with 100 ml of benzene. The benzene was evaporated to remove final traces of thionyl chloride, and the mixture cooled to 5°C. A fresh portion of 80 ml. of benzene was added. A solution of 23.1 gr. (0.25 moles) of aniline and 20 grams of pyridine in 35 ml. of benzene was added dropwise at 5°C and then left overnight at room temperature. The resulting precipitate was filtered and washed with a small quantity of fresh benzene, thus 36.5 gr. of cinnamanilide were obtained, which melted at 153°C after recrystallization from ethanol. This is a known compound and its preparation is given in order to illustrate the process.

EXAMPLE 2 - 3,3',4,4'-Tetrachlorocinnamanilide

To 54.25 gr. (0.25 moles) of 3,4-dichlorocinnamic acid were added 540 gr. of thionyl chloride, and the mixture refluxed for 4 hours. The excess thionyl chloride was distilled off at reduced pressure and the residue was shaken with benzene (100 mls). The benzene was evaporated, and the mixture cooled to 5°, and a fresh portion of 150 ml. of benzene was added. A solution of 40 gr. (0.25 moles) of 3,4-dichloroaniline and 20 gr. of pyridine in 50 ml. of benzene was added dropwise at 5° and left overnight at room temperature. The resulting precipitate was filtered and washed with a small quantity of fresh benzene. 75.2 gr. of 3,3',4,4'-tetrachlorocinnamanilide were obtained, M.P.=198°–200°C after recrystallization from ethanol.

EXAMPLE 3 - 3,4-Dimethoxy-3',4'-dichlorocinnamanilide

To 52 gr. (0.25 moles) of 3,4-dimethoxy cinnamic acid was added 520 gr. of freshly distilled thionyl chloride, and the mixture refluxed for four hours, and further treated as in Example 1. 47 grams of 3,4-dimethoxy-3,4-dichlorocinnamanalide were obtained which, after recrystallization from ethanol, melted at 175°–176°C.

EXAMPLE 4 - 3,4-methylenedioxy-3',4'-dichlorocinnamanilide

To 48 gr. of 3,4-methylenedioxy cinnamic acid was added 480 gr. of thionyl chloride, and the mixture refluxed for four hours and then treated further as in Example 2. 83 grams of 3,4-methylenedioxy-3',4'-dichlorocinnamanilide were obtained, M.P.=175°–177°C (after recrystallization from ethanol). Similarly prepared were 2,3',4'- and 4,3',4'- trichlorocinnamanilide and 3,4,5-trimethoxy-3',4'-dichlorocinnaminilide. Yields and properties are given in Table I.

EXAMPLE 5

In a manner similar to Example 2, 3, 4-dichlorophenyl-1-chloro-prop-1-enoic acid- 3',4'-dichloroanilide was prepared from the 3,4-dichloroaniline and 3,4-dichlorophenyl-1-chloropropen-1-oic acid chloride.

EXAMPLE 6

The activity of 3,3',4,4'-tetrachlorocinnamanilide was tested in an agar-plate test against the fungus verticillium and found to be an effective agent against this fungus.

TABLE I.—CINNAMANILIDES

The following compounds were prepared (structural formulae, melting points and yields given; elemental analyses were as expected in all cases).

| Compounds | Melting point | Lit.M.P. | Yield, percent |
|---|---|---|---|
| 1. Ph—CH=CHCONH—Ph | 153° | 153 (known) | 62 |
| 2. Ph—CH=CHCOHN—(2,4-Cl₂C₆H₃) | 179–80° | 170–81 (known) | 70 |
| 3. (3,4-Cl₂C₆H₃)—CH=CHCONH—(2,4-Cl₂C₆H₃) | 198–200° | New cmpd | 80 |
| 4. (3,4-(CH₃O)₂C₆H₃)—CH=CHCONH—(3,4-Cl₂C₆H₃) | 175–6° | New cmpd | 53 |
| 5. (3,4,5-(CH₃O)₃C₆H₂)—CH=CHCONH—(3,4-Cl₂C₆H₃) | 195–8° | New cmpd | 76 |
| 6. (3,4-OCH₂O-C₆H₃)—CH=COCONH—(3,4-Cl₂C₆H₃) | 175–7° | New cmpd | 100 |
| 7. (3,4-Cl₂C₆H₃)—C(Cl)=CHCONH—(3,4-Cl₂C₆H₃) | 200–9° | New cmpd | 70 |

What is claimed is:

1. A cinnamanilide having the general formula

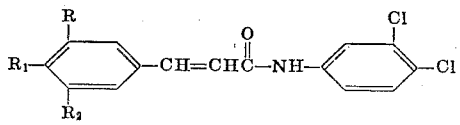

wherein R and $R_1$ are selected from the group consisting of chlorine, lower alkoxy of 1 to 4 carbon atoms, and where R and $R_1$ can together form the group $-OCH_2O-$ or $-O-CH_2CH_2O-$;

and $R_2$ is selected from the group consisting of chlorine and lower alkoxy of 1 to 4 carbon atoms.

2. A compound of claim 1, which is: 3,3',4,4'-tetrachlorocinnamanilide.

3. A compound of claim 1, which is: 3,4-dimethoxy-3',4'-dichlorocinnamanilide.

4. A compound of claim 1, which is: 3,4-methylenedioxy-3',4'-dichlorocinnamanilide.

5. A compound of claim 1: 3,4-dichlorophenyl-1-chloro-prop-1-enoic acid-3', 4'-dichloroanilide.

* * * * *